United States Patent Office 3,489,641
Patented Jan. 13, 1970

3,489,641
HETEROFILAMENTS FROM POLYAMIDES AND POLYESTERS
Antoni Harcolinski, Pontypool, and John Mather, Harrogate, England, assignors to Imperial Chemical Industries Limited, Millbank, London, England, a corporation of Great Britain
No Drawing. Filed Feb. 15, 1967, Ser. No. 616,151
Claims priority, application Great Britain, Feb. 24, 1966, 8,168/66
Int. Cl. D02g 3/04
U.S. Cl. 161—177     7 Claims

ABSTRACT OF THE DISCLOSURE

A side-by-side conjugate filament is disclosed which consists of a polyamide as the one component and a polyester made from ethylene glycol and a bis (p,p¹-carboxy phenoxy) alkane as the other component.

---

The present invention is concerned with conjugate filaments obtained from polyamides and polyesters and especially with conjugate filaments in which the components exist in a side-by-side relationship.

It has been proposed, for example in British patent specification No. 803,033 to prepare conjugate filaments in which one component is a polyester and the other component is a polyamide, conjugate filaments being characterised in having a high potential crimp and (when crimped) good crimp permanence. However, owing to the inherent incompatibility of polyamides and polyesters such as polyethylene terephthalate the adherance between the components is frequently poor and there is a tendency, when in a side-by-side arrangement, for them to separate, for example during the drawing process. Hence these filaments have little commercial interest. The problem of separation of the components, commonly called fibrillation, can, of course, be overcome by forming a conjugate filament in which the components exist in a sheath/core relationship, but the preparation of sheath/core conjugate filaments is generally technically less attractive than the side-by-side structure.

We have now found that a side-by-side conjugate filament consisting of a polyamide as one component and a polyester as another component which does not suffer from the disadvantage of separation of these components during drawing, can be obtained by using, as the polyester component, the polyester made from ethylene glycol and a bis (p,p¹-carboxy phenoxy) alkane. Up to about 10% by weight of a glycol other than ethylene glycol may be included and up to 20% of the bis (p,p¹-carboxy phenoxy) alkane may be replaced by terephthalic acid without adverse effect.

Accordingly therefore the present invention, from one aspect, provides a drawn and molecularly oriented conjugate filament comprising as one component a polyamide and as another component a polyester having a repeat unit:

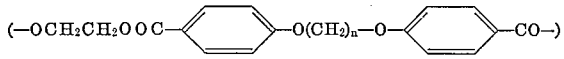

where $n = 2$ to 6.

The polyester may be a copolyester containing up to 20% by weight of terephthalic acid repeat units and/or up to 10% by weight of repeat units derived from a glycol of the formula (—O—R—O—), where $R = (CH_2)_m$ or —CH₂CH₂—O—CH₂CH₂— and $m = 3$ to 6.

Preferably the components of the conjugate filament exist in a side-by-side arrangement.

Conjugate filaments as described above are characterised by crimping spontaneously when relaxed after drawing.

The filaments of this invention should have after relaxing in water near its boiling point, in the crimped state, a crimp helix diameter of not greater than 1.0 mm., a crimp ratio of not less than 14 and a crimp frequency of not less than 4.0 crimps per cm. as hereinafter defined. Preferably the helix diameter is not greater than 0.7 mm., the crimp ratio not less than 65 and the crimp frequency not less than 30 crimps per cm.

We have found that, in order to ensure the complete absence of fibrillation, the conjugate filament described above should preferably be drawn immediately after spinning or stored at a relative humidity of at least 65% and a temprature of about 71–73° F. before drawing Some filaments show fibrillation if stored at a lower relative humidity before drawing.

From another aspect therefore, the present invention provides a process of the production of a conjugate filament as hereinbefore defined comprising simultaneously extruding the components through the same extrusion orifice in a side-by-side relaitonship solidifying the filament and subsequently drawing the filament immediately after extrusion or after storing at a relative humidity of at least 65%.

The filament may be wound into a package or the like before drawing, this being essential if the filament is to be lagged. Drawing may be carried out by passing the filaments between a first and second set of rotating rolls, commonly called the feed and draw rolls respectively, the second set rotating at a greater peripheral speed than the first so as to stretch the filament by an amount equivalent to the ratio of the surface speeds of the rolls. Preferably a snubbing pin is positioned between the two sets of rolls to locate the point of draw of the filament. It is also preferred that the filament should be heated during drawing, for example by passage over a plate or a snubbing pin heated to at least 100° C.

The polyamides employed in this invention may be homopolymers or copolymers. Especially suitable are polyhexamethylene adipamide, polyepsilon caprolactam, polyhexamethylene suberamide and copolymers of polyepsilon caprolactam with polyhexamethylene adipamide especially the 20/80 w./w. copolymer.

The following examples illustrate but do not limit the invention:

EXAMPLE 1

Conjugate filaments were obtained by the melt extrusion of polyhexamethylene adipamide and the polyester made from ethylene glycol and 4.4' dicarboxy-phenoxy-ethane in a side-by-side arrangement at a temperature of 290° C., and the solid filaments wound up onto a package as a yarn. Before drawing the yarn was held at a temperature of about 72° F. and a relative humidity of about 67% for 24 hours. The yarn was drawn at a speed of 275 ft./min. and a draw ratio of 5.5, being passed over a hot plate at 150° C. positioned between the draw rolls and snubbing pin, without fibrillation. The drawn yarn had a denier of 7.5, a tenacity of 7.1 g./d. and an extension to break of 15.5%. A fine helical crimp having good crimp permanence was obtained when the drawn yarn was relaxed under ambient conditions, the crimp being further developed when the filament was relaxed in hot air, at about 150° C., or in water near its boiling point. After relaxing in boiling water for one minute and then further relaxing for one minute out of water the filaments had the following characteristics:

Crimp ratio percent: 80
Crimp frequency: 31.5 per cm.
Helix diameter: 0.5 mm.
Crimp permanence: 0.9

Crimp ratio was calculated from the expression:

$$C.R. = \frac{Lo-a}{Lo} \times 100$$

Crimp frequency from the expression:

$$C.F. = n/a$$

and crimp permanence from the expression:

$$C.P. = \frac{Lo-b}{Lo-a}$$

where
Lo = length of uncrimped filament
$a$ = length of crimped filament
$n$ = number of loops in length $a$
$b$ = length of crimped filament after being tensioned under a load of 0.3 g./denier for one minute and then allowed to relax untensioned for one minute.

EXAMPLE 2

A sample of the undrawn yarn of Example 1 was drawn at a speed of 200 ft./min. without heating at a draw ratio of 4.0 to give a drawn yarn having a denier of 9.5, tenacity of 3.5 g./d. and an extension to break of 23.8%. This yarn also developed a helical crimp when relaxed under ambient conditions the crimp being further improved by relaxation in hot air or boiling water. After relaxing in boiling water for one minute and then further relaxing for one minute out of the water the filaments had the following characteristics:

Crimp ratio: 45%
Crimp frequency: 8 per cm.
Helix diameter: 0.8 mm.

The spontaneous crimp developed by the filaments of Example 1 is illustrated in the following example:

EXAMPLE 3

A 10 cm. length of an undrawn filament of Example 1 was inserted between the jaws of an Instron tensile tester and extended at a rate of 100 cm./min. to a draw ratio of 3.2, the load was then relaxed at the same speed; the distance apart of the jaws when the load became zero was used as a measure of filament length with crimp removed (Lo). The test was carried out at room temperature at a relative humidity above 65%. The results obtained on the drawn yarn are given in Table 1.

TABLE 1

|  | Minimum | Maximum | Mean |
|---|---|---|---|
| Mean of 10 tests: | | | |
| Denier | 15.9 | 17.6 | 16.9 |
| C.R., percent | 15.0 | 27.0 | 21 |
| C.F., per cm | 5.9 | 6.4 | 6.0 |
| R.F., per cm | 0.3 | 0.4 | 0.35 |
| Mean of 6 tests: | | | |
| C.P. | 0.2 | 0.5 | 0.4 |
| Helix diameter, mm | 0.5 | 0.7 | 0.6 |

The same sample of the crimped filament was fatigued by being inserted in the jaws of the Instron tensile tester and extended to 14% above the Lo value at a speed of 50 cm./min. and then relaxed at the same speed. This cycling was repeated 10 times and the values of C.R., C.F., R.F. and helix diameter recalculated. Results from two tests are given in Table 2.

TABLE 2

|  | C.R. | C.F., per cm. | R.F., per cm. | Diameter, mm. |
|---|---|---|---|---|
| After fatiguing | 32.0 | 12.0 | 0.28 | 0.55 |
|  | 28 | 11.7 | 0.26 | 0.7 |
| Before fatiguing (mean) | 21 | 12.5 | 0.28 | 0.6 |

The above results indicate an increased C.R. after fatiguing, the other values not being significantly affected.

R.F. is reversal frequency and is calculated from the expression:

$$R.F. = r/a$$

where $r$ = number of crimp reversals in the crimped length $a$.

The reversal frequency is a measure of the number of times the helical crimp in a filament reverses direction per centimeter to maintain a stable filament.

EXAMPLES 4–8

A series of other combinations of polymers were rod spun as monofilaments at a rate of extrusion of 1.3 g./min. and a wind up speed of 600 ft./min. The undrawn filaments were drawn over a heated plate and relaxed in water near its boiling point for one minute under zero tension and further relaxed for one minute out of the water and the crimped characteristics determined. Spinning and drawing details and crimp characteristics are given in Table 3:

TABLE 3

| | Components | | Spinning temp.,° C. | Draw ratio | Plate temp.,° C. | C.R., percent | C.F., per cm. | Helix diameter, mm. |
|---|---|---|---|---|---|---|---|---|
| | 1 (Polyamide) | 2 (Polyester) | | | | | | |
| Example: | | | | | | | | |
| 4 | 6.8 | CPE.2G | 290 | 5.0 | 125 | 80 | 27 | 0.7 |
| 5 | 6 | CPE.2G | 275 | 5.5 | 125 | 81 | 32 | 0.6 |
| 6 | 6 | CBE.2G | 266 | 5.0 | 140 | 82 | 50 | 0.6 |
| 7 | 66/6(80/20) | CPE.2G | 280 | 5.5 | 135 | 81 | 40 | 0.6 |
| 8 | 66/6(80/20) | CPE.2G | 280 | 5.0 | 20 | 52 | 14 | 1.0 |

CPE.2G is the polyester prepared from ethylene glycol and 4.4'-dicarboxy-phenoxy ethane and has the repeat unit

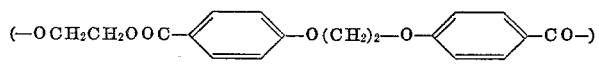

CBE.2G is the polyester prepared from ethylene glycol and 4,4'- dicarboxy-phenoxy butane and has the repeat unit

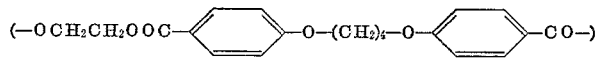

No fibrillation was observed on any of the drawn samples.

The above conjugate filaments contained equal proportions of polyamide and polyester. A conjugate filament spun from CPE.2G and 66 nylon in the ratio 1:2 also showed a good crimp after drawing and relaxing in water near its boiling point.

What we claim is:

1. A drawn and molecular oriented conjugated filament consisting of at least two components existing in a side-by-side relationship, one component being a polyamide and one other component a polyester of repeat unit:

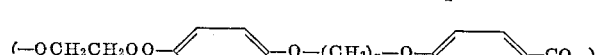

where $n=2$ to 6.

2. A filament according to claim 1 wherein the polyester is a copolyester containing up to 20% by weight of terephthalic acid repeat units.

3. A filament according to claim 1, wherein the polyester is a copolyester containing up to 10% by weight of repeat units derived from a glycol, of the formula (—O—R—O—)

where R=$(CH_2)_m$ and $m=3$ to 6 or

—$CH_2CH_2$—O—$CH_2CH_2$—

4. A filament according to claim 1 wherein the polyamide is polyhexamethylene suberamide, polyepsilon caprolactam, polyhexamethylene adipamide or a copolymer of polyhexamethylene adipamide and polyepsilon caprolactam.

5. A filament according to claim 4 wherein the copolymer of polyhexamethylene adipamide and polyepsilon caprolactam contains 20% by weight of polyepsilon caprolactam.

6. A filament according to claim 1 wherein the polyester has the repeat units:

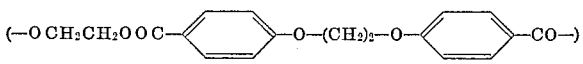

7. A filament according to claim 1 wherein the polyester has the repeat units:

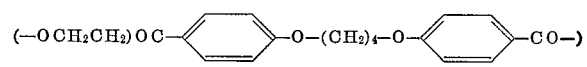

References Cited

UNITED STATES PATENTS 3,118,011   1/1964   Breen _____ 264—168

ROBERT F. BURNETT, Primary Examiner

LINDA M. CARLIN, Assistant Examiner

U.S. Cl. X.R.

161—173; 264—171